United States Patent
Fiaschi et al.

(10) Patent No.: US 11,012,378 B2
(45) Date of Patent: May 18, 2021

(54) METHODS AND APPARATUS FOR SHARED BUFFER ALLOCATION IN A TRANSPORT NODE

(71) Applicant: Telefonaktiebolaget LM Ericsson (publ), Stockholm (SE)

(72) Inventors: Giovanni Fiaschi, Stockholm (SE); Stefan Dahlfort, Stockholm (SE); Jonas Emanuel Rosenberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/322,180

(22) PCT Filed: Aug. 2, 2016

(86) PCT No.: PCT/EP2016/068460
§ 371 (c)(1),
(2) Date: Jan. 31, 2019

(87) PCT Pub. No.: WO2018/024324
PCT Pub. Date: Feb. 8, 2018

(65) Prior Publication Data
US 2019/0190856 A1    Jun. 20, 2019

(51) Int. Cl.
*H04L 12/861*   (2013.01)
*H04L 12/26*    (2006.01)

(52) U.S. Cl.
CPC ........ *H04L 49/9005* (2013.01); *H04L 43/026* (2013.01)

(58) Field of Classification Search
CPC ................. H04L 49/9005; H04L 43/026
See application file for complete search history.

(56) References Cited

U.S. PATENT DOCUMENTS

| | | | | |
|---|---|---|---|---|
| 6,741,570 B1 * | 5/2004 | Kojima | ............... | H04L 12/5601 370/232 |
| 8,874,823 B2 * | 10/2014 | Joshi | ................... | G06F 9/45558 711/138 |

(Continued)

FOREIGN PATENT DOCUMENTS

CN             103534997 A        1/2014

OTHER PUBLICATIONS

Buffer Requirements for High-Speed Routers by Damon Wischik—2005.

(Continued)

*Primary Examiner* — Michael A Keller
(74) *Attorney, Agent, or Firm* — Baker Botts, LLP (57) ABSTRACT

A method (200) for controlling shared buffer capacity in a packet switched network is disclosed, the packet switched network comprising a plurality of transport nodes, each node comprising a shared buffer capacity which may be allocated to interfaces of the transport node. The method comprises obtaining a configuration of traffic flows within the network (210). The method further comprises, for a transport node, determining, on the basis of traffic flows within the network, an allocation of the transport node's shared buffer capacity between interfaces of the transport node to limit overall packet latency for the transport node (220), and causing the determined allocation of shared buffer capacity to be applied in the transport node (230). Also disclosed are an apparatus (600, 800) and a transport node (700, 900) in a packet switched network and a computer program product configured to carry out methods in a packet switched network and a transport node.

19 Claims, 8 Drawing Sheets

(56) References Cited

U.S. PATENT DOCUMENTS

| | | | |
|---|---|---|---|
| 2008/0192765 A1 | 8/2008 | Oh et al. | |
| 2012/0275301 A1* | 11/2012 | Xiong | H04L 49/357 370/230 |
| 2016/0285750 A1* | 9/2016 | Saquib | H04L 45/64 |
| 2018/0352057 A1* | 12/2018 | Li | H04L 45/24 |
| 2019/0387434 A1* | 12/2019 | Li | H04W 28/10 |
| 2020/0106824 A1* | 4/2020 | Erkin | H04L 65/80 |

OTHER PUBLICATIONS

High Performance TCP in ANSNET by Villamizar et al.—Sep. 12, 1994.

Strataxgs Tomahawk; Introducing Tomahawk: New StrataXGS Series Scales Up the Cloud by Christian Plante—Sep. 24, 2014.

Network Traffic DAT Analysis, Louisiana State University, LSU Digital Commons, LSU Mater's Theses by Harish Kapri—2011.

Optimal Choice of the Buffer Size in the Internet Routers by Konstantin Avrachenkov et al.—2005.

Packet Buffer, https://people.ucsc.edu/~warner/buffer-wuz.html—retrieved Jan. 30, 2019.

A Resource-Efficient System for Measuring Flow Length Distribution, 2009 International Conference on Frontier of Computer Science and Technology by Weijang Liu et al.—2009.

Router Buffer Sizes in the WAN by K. Subramaniam, Ed. and D. Loher—Jul. 7, 2015.

Router Buffer Sizing Revisited: The Role of the Output/Input Capacity Ratio by Ravi S. Prasad et al.—2007.

PCT Notification of Transmittal of the International Search Report and the Written Opinion of the International Searching Authority, or the Declaration for International application No. PCT/EP2016/068460—dated May 30, 2017.

Sizing Router Buffers by Guido Appenzeller et al. with Computer Systems Laboratory at Stanford University—Copyright 2004.

System-Level Buffer Allocation for the Application-Specific Networks-On-Chip Router Design by Jingcao Hu et al.; IEEE Transactions on Computer-Aided Design of Integrated Circuits and Systems, vol. 25, No. 12—Dec. 2006.

Chinese Office Action issued for 201680089812.5, dated Nov. 12, 2020.

A Resource-Efficient System for Measuring Flow Length Distribution by Weijiang Liu et al.; 2009 International Conference on Frontier of Computer Science and Technology—2009.

\* cited by examiner

METHODS AND APPARATUS FOR SHARED BUFFER ALLOCATION IN A TRANSPORT NODE

PRIORITY

This nonprovisional application is a U.S. National Stage Filing under 35 U.S.C. § 371 of International Patent Application Serial No. PCT/EP2016/068460 filed Aug. 2, 2016 and entitled "Methods and Apparatus for Shared Buffer Allocation in A Transport Node" which is hereby incorporated by reference in its entirety.

TECHNICAL FIELD

The present disclosure relates to methods performed in a packet switched network comprising a plurality of transport nodes, and in a transport node of such a network. The present disclosure also relates to apparatus and to a computer program product configured, when run on a computer, to carry out methods performed in a packet switched network and a transport node.

BACKGROUND

Communication networks typically comprise a plurality of transport nodes, enabling the distribution of data throughout the network. Packet switching in such networks involves the use of buffers at ingress (Rx) and egress (Tx) interfaces of the transport nodes, which may for example be IP routers. The buffers provide temporary storage of incoming and outgoing data packets, allowing the network to control the rate of packet drops and the quality of datagram transport. When buffer capacity is exhausted for a particular packet queue at an interface, packets are dropped according to the queueing policies applied at the interface. The physical memory components used to provide buffer capacity for transport nodes can be expensive, meaning router vendors do not have the possibility to provide an excessive amount of buffer capacity. Typical total buffer capacity for a transport node may vary from less than one MB to several GB, depending upon the nature of the transport node. Additional limitations on buffer capacity may be imposed by circuit integration, including for example System-on-Chip (SoC) architectures, in which integration advantages are balanced by limitations in die size and process, meaning overall buffer capacity cannot scale with system throughput.

Figure 1:
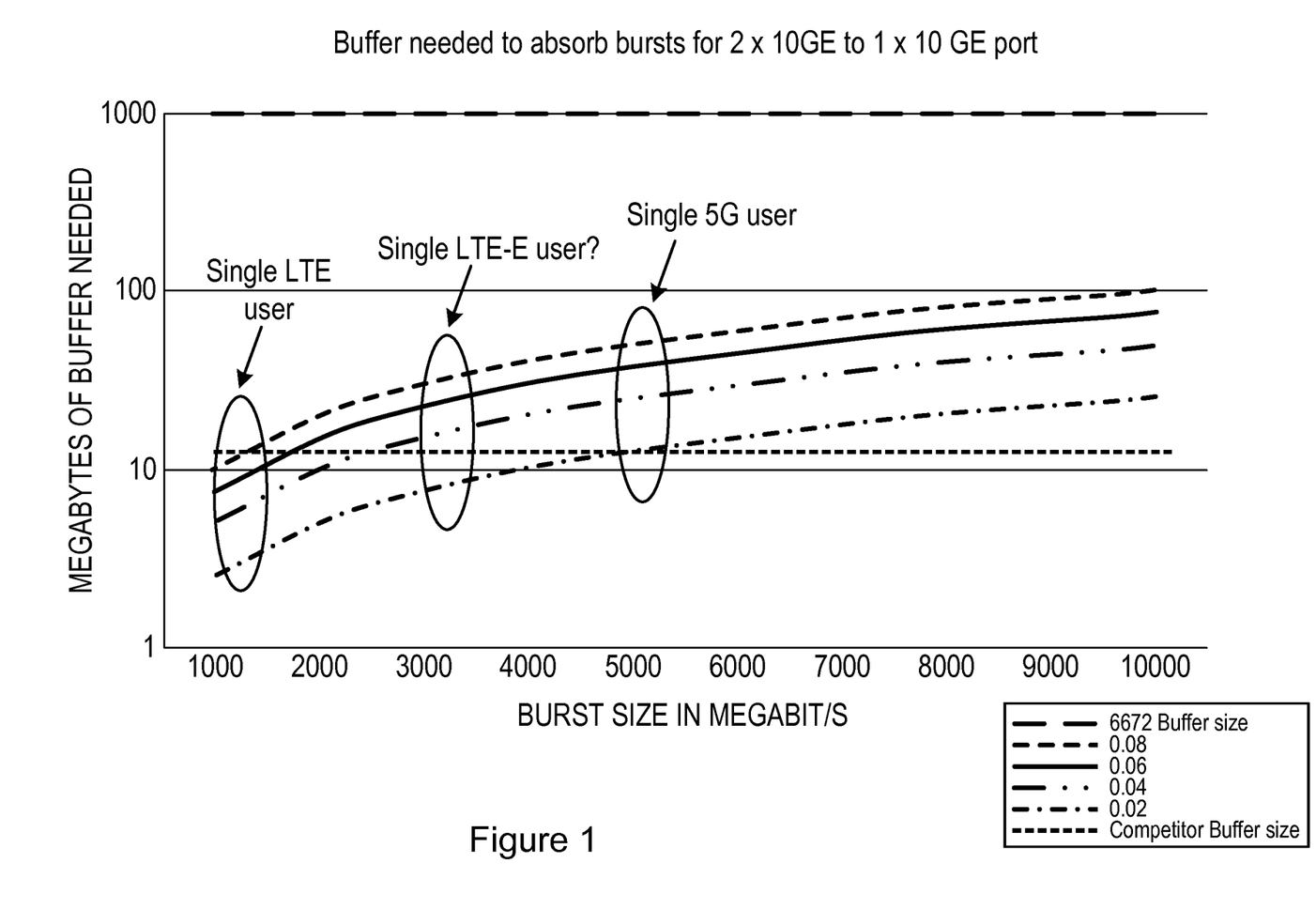
FIG. 1 is a graph illustrating buffer requirements for transport nodes.

Accurate buffer dimensioning; balancing buffer requirements for predicted traffic throughput and forwarding characteristics against cost of providing buffer capacity, remains an ongoing challenge. This is particularly the case for transport nodes which are to be positioned close to the access portion of a communication network, where traffic variability is great, with incoming traffic flows demonstrating high levels of burstiness (traffic characterised by intermittent bursts in which inter packet gaps are considerably shorter than for packets arriving before or after the burst). Transport nodes in a core network benefit from flow shaping performed by the buffering action of peripheral nodes, and so generally process traffic demonstrating greatly reduced burstiness compared with transport nodes near the access portion of the network. FIG. 1 illustrates buffer capacity required to absorb bursts of different size and duration, and illustrates the high degree of variability in buffer requirements which may be experienced depending on the burstiness of the traffic to be buffered. The exact behaviour of individual users, and the number of concurrent users, are unknown factors which increase the uncertainty in buffer requirements.

Many existing IP routers seek to address the problem of buffer dimensioning through the use of a shared buffer capacity, which capacity may be allocated to different ports of the router. The precise allocation of this shared resource to the individual ingress and egress ports may be static or may be dynamically decided on the basis of measurements made by the router at individual interfaces. While such shared buffer capacity can provide performance advantages over individual interface buffers, improving router performance with respect to packet loss and overall transport quality, and reducing the cost associated with router buffering, remain priorities for further development.

SUMMARY

It is an aim of the present disclosure to provide a method and apparatus which obviate or reduce at least one or more of the challenges mentioned above.

According to a first aspect of the present disclosure, there is provided a method for controlling shared buffer capacity in a packet switched network comprising a plurality of transport nodes, each node comprising a shared buffer capacity which may be allocated to interfaces of the transport node. The method comprises obtaining a configuration of traffic flows within the network. The method further comprises, for a transport node, determining, on the basis of traffic flows within the network, an allocation of the transport node's shared buffer capacity between interfaces of the transport node to limit overall packet latency for the transport node, and causing the determined allocation of shared buffer capacity to be applied in the transport node.

For the purposes of the present disclosure, a traffic flow within the network is defined as a sequence of packets sent from a particular source to a particular unicast, anycast, or multicast destination that the source desires to label as a flow. A traffic flow may be established within any packet switching technology including for example IPv4, IPv6, Multi-Protocol Label Switching (MPLS) and Segment Routing. Different classification options for traffic flows exist in accordance with the different packet switching technologies. For example a traffic flow in IPv4 or IPv6 may be classified using the 5-tuple flow identity of the source address, destination address, source port, destination port and the transport protocol type. For IPv6, in the event that certain of these fields are unavailable owing to fragmentation or encryption, traffic flows may be classified by the 3-tuple of flow label, source address, and destination address. In MPLS, Label Switched Paths (LSPs) may be used for flow classification, identified by labels with local significance and not requiring source and destination addresses. Other classification options exist for other packet switching technologies.

By basing shared buffer capacity allocation on traffic flows within the network, examples of the disclosure provide an allocation of buffer capacity that is based on actual network need. This is in contrast to the local resource availability that can be determined by existing transport nodes on the basis of local measurements on individual node interfaces. In addition, the global network view provided by obtaining a configuration of traffic flows within the network provides a wide perspective of network need, allowing for a more effective allocation of buffer resources from the point of view of improving overall network performance and throughput, compared to the allocation that can be determined by an individual transport node on the basis of local considerations only.

According to examples of the disclosure, the interfaces may be either or both of Receive (Rx) and/or Transmit (Tx) interfaces. The transport nodes may comprise one or more Network Interface Cards (NICs) and the buffer capacity of the transport nodes may be shared at card and/or at node level. The transport nodes may for example be network routers.

According to examples of the disclosure, obtaining a configuration of traffic flows within the network may comprise obtaining the configuration from a network element having a Traffic Engineering function in the network. The network element may for example comprise a Path Computation Element (PCE).

According to examples of the disclosure, obtaining a configuration of traffic flows within the network may comprise performing flow monitoring within the network.

According to examples of the disclosure, obtaining a configuration of traffic flows within the network may comprise obtaining, for at least a part of the network: the number of concurrent traffic flows, and, for each concurrent traffic flow: the length of the flow and a flow identity. The flow identity may for example comprise a 5-tuple flow identity.

According to examples of the disclosure, determining, on the basis of traffic flows within the network, an allocation of the transport node's shared buffer capacity between interfaces of the transport node to limit overall packet latency for the transport node may comprise determining the allocation of shared buffer capacity on the basis of an identity and a characteristic of the flows within the network.

According to examples of the disclosure, the characteristic of the traffic flows may comprise burstiness of the traffic flows. Alternatively or in addition, the characteristic of the traffic flows may comprise traffic flow length, traffic flow size (in bytes), or packet drops for example with associated reason for the drop.

According to examples of the disclosure, determining the allocation of shared buffer capacity on the basis of an identity and a characteristic of the traffic flows within the network may comprise performing an assumption about the burstiness of traffic flows within the network based on the identity of the traffic flows and a location and interface connectivity of the transport node in the network topology. According to examples of the disclosure, flow identity together with network topology and interface connectivity may be used to determine which interfaces of a transport node have a high proportion of originating flows and which have a high proportion of transiting flows, which, owing to previous flow shaping, will have a lower level of burstiness than originating flows and hence may be processed with less buffer capacity.

According to examples of the disclosure, determining, on the basis of traffic flows within the network, an allocation of the transport node's shared buffer capacity between interfaces of the transport node to limit overall packet latency for the transport node may further comprise determining the allocation of shared buffer capacity on the basis of a resilience mechanism used in the network.

According to examples of the disclosure, determining, on the basis of traffic flows within the network, an allocation of the transport node's shared buffer capacity between interfaces of the transport node to limit overall packet latency for the transport node may further comprise determining the allocation of shared buffer capacity on the basis of a type of packet scheduling used in the network.

According to examples of the disclosure, causing the determined allocation of shared buffer capacity to be applied in the transport node may comprise causing a message to be transmitted to the transport node, the message including the determined shared buffer allocation and an instruction to apply the determined shared buffer allocation.

According to examples of the disclosure, the method may be conducted in a centralised management entity, which centralised management entity may for example comprise a physical functional unit, an application or a Virtualised Network Function (VNF).

According to examples of the disclosure, the network may comprise a Software Defined Network (SDN), and the centralised management entity may be incorporated within or in communication with an SDN controller of the network.

According to examples of the disclosure, the method may further comprise distributing the obtained configuration of traffic flows to the transport node, and causing the determined allocation of shared buffer capacity to be applied in the transport node may comprise applying the determined allocation of shared buffer capacity in the transport node.

According to examples of the disclosure, obtaining a configuration of traffic flows within the network may be conducted in a centralised management entity, and determining, on the basis of traffic flows within the network, an allocation of the transport node's shared buffer capacity between interfaces of the transport node to limit overall packet latency for the transport node, and causing the determined allocation of shared buffer capacity to be applied in the transport node, may be conducted within the transport node.

According to another aspect of the present disclosure, there is provided a method in a transport node of a packet switched network, the transport node comprising a shared buffer capacity which may be allocated to interfaces of the transport node. The method comprises receiving a message including a determined shared buffer allocation and an instruction to apply the determined shared buffer allocation, and applying the determined shared buffer allocation from the received message.

According to another aspect of the present disclosure, there is provided a method in a transport node of a packet switched network, the transport node comprising a shared buffer capacity which may be allocated to interfaces of the transport node. The method comprises receiving a configuration of traffic flows within the network from a centralised management entity, determining, on the basis of traffic flows within the network, an allocation of the transport node's shared buffer capacity between interfaces of the transport node to limit overall packet latency for the transport node, and applying the determined shared buffer allocation.

According to another aspect of the present disclosure, there is provided a computer program comprising instructions which, when executed on at least one processor, cause the at least one processor to carry out a method according to any one of the preceding aspects of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

Examples of computer readable storage media may include electronic memory such as RAM, ROM, Flash memory, magnetic tape, CD-ROM, DVD and Blueray disc.

According to another aspect of the present disclosure, there is provided a computer program product comprising non transitory computer readable media having stored thereon a computer program according to a preceding aspect of the present disclosure.

Non transitory computer readable storage media comprises any computer readable storage medium other than a transitory signal. Examples of non transitory computer readable storage media may include electronic memory such as RAM, ROM, Flash memory, magnetic tape, CD-ROM, DVD and Blueray disc.

According to another aspect of the present disclosure, there is provided apparatus for controlling shared buffer capacity in a packet switched network comprising a plurality of transport nodes, each node comprising a shared buffer capacity which may be allocated to interfaces of the transport node. The apparatus comprises a processor and a memory, the memory containing instructions executable by the processor such that the apparatus is operative to obtain a configuration of traffic flows within the network. The apparatus is further operative to, for a transport node, determine, on the basis of traffic flows within the network, an allocation of the transport node's shared buffer capacity between interfaces of the transport node to limit overall packet latency for the transport node, and cause the determined allocation of shared buffer capacity to be applied in the transport node.

According to examples of the disclosure, the apparatus may be further operative to perform a method according to any one of the preceding aspects of the present disclosure.

According to another aspect of the present disclosure, there is provided a transport node of a packet switched network, the transport node comprising a shared buffer capacity which may be allocated to interfaces of the transport node, the transport node further comprising a processor and a memory. The memory contains instructions executable by the processor such that the transport node is operative to receive a message including a shared buffer allocation and an instruction to apply the determined shared buffer allocation, and apply the shared buffer allocation from the received message.

According to another aspect of the present disclosure, there is provided a transport node of a packet switched network, the transport node comprising a shared buffer capacity which may be allocated to interfaces of the transport node, the transport node further comprising a processor and a memory. The memory contains instructions executable by the processor such that the transport node is operative to receive a configuration of traffic flows within the network from a centralised management entity, determine, on the basis of traffic flows within the network, an allocation of the transport node's shared buffer capacity between interfaces of the transport node to limit overall packet latency for the transport node, and apply the determined shared buffer allocation.

According to another aspect of the present disclosure, there is provided apparatus for controlling shared buffer capacity in a packet switched network comprising a plurality of transport nodes, each node comprising a shared buffer capacity which may be allocated to interfaces of the transport node. The apparatus comprises a traffic flow unit adapted to obtain a configuration of traffic flows within the network. The apparatus further comprises a buffer allocation unit adapted to, for a transport node, determine, on the basis of traffic flows within the network, an allocation of the transport node's shared buffer capacity between interfaces of the transport node to limit overall packet latency for the transport node, and cause the determined allocation of shared buffer capacity to be applied in the transport node.

According to another aspect of the present disclosure, there is provided a transport node of a packet switched network, the transport node comprising a shared buffer capacity which may be allocated to interfaces of the transport node. The transport node further comprises a receiving unit adapted to receive a message including a shared buffer allocation and an instruction to apply the determined shared buffer allocation, and a buffer allocation unit adapted to apply the shared buffer allocation from the received message.

According to another aspect of the present disclosure, there is provided a transport node of a packet switched network, the transport node comprising a shared buffer capacity which may be allocated to interfaces of the transport node. The transport node further comprises a receiving unit adapted to receive a configuration of traffic flows within the network from a centralised management entity. The transport node further comprises a buffer allocation unit adapted to determine, on the basis of traffic flows within the network, an allocation of the transport node's shared buffer capacity between interfaces of the transport node to limit overall packet latency for the transport node, and to apply the shared buffer allocation from the received message.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Aspects of the present disclosure provide a method according to which a determination of shared buffer allocation for a transport node is made in a centralised manner, on the basis of network flow configuration. This determination may be made in a centralised network entity, which may for example be an application hosted on or in communication with an SDN controller. Determining buffer allocation in a centralised entity, with a global view of network flow configurations, allows for a more efficient allocation of shared buffer capacity in individual transport nodes. By taking account of the wider network conditions and network needs, as indicated by the flow configuration, overall network performance may be optimised through efficient buffer allocation in individual transport nodes.

A wide range of factors influence the amount of buffer capacity that may be required on any given transport node interface in order to ensure acceptable node performance. These factors include the location of the node within the network and the number and nature of traffic sources sending traffic via the node. The number of sources of bursty traffic in particular, the characteristics of received traffic bursts and at how many nodes received traffic has already been aggregated all influence the buffer requirements for any individual interface. Additionally, the type of network resilience employed in the network will affect buffer requirements, with for example mesh based and length of links schemes posing differing requirements. The type of packet scheduling (Weighted Fair Queueing (WFQ), Weighted Random Early Detection (WRED), hierarchical etc.) also affects the buffer requirements for individual transport node interfaces.

Existing work on buffer dimensioning for transport nodes has focussed on static and local requirements, and generally uses core network routers as reference nodes. However, in the core network, aggregation can guarantee that burstiness is reduced to a minimum level, thus simplifying and reducing the buffer requirements for interfaces of these nodes. Existing dynamic buffer allocation schemes are conducted within individual routers on a per interface basis, with measurements conducted of aggregated traffic on individual interfaces, and buffer allocation determined on the basis of these local measurements. In contrast to this existing work, aspects of the present disclosure enable buffer allocation in individual transport nodes to be determined on the basis of global considerations of traffic flow. According to examples of the present disclosure, transport node location, network resilience schemes and packet scheduling, and the identity and characteristics of long lasting traffic flows within the network may all be taken into account in determining shared buffer allocation, thus allowing for an allocation that favours overall network performance. Examples of the present disclosure may thus provide either or both of superior network performance with existing buffer capacity, or the possibility to achieve comparable network performance with reduced buffer capacity, so reducing hardware costs.

Figure 2:
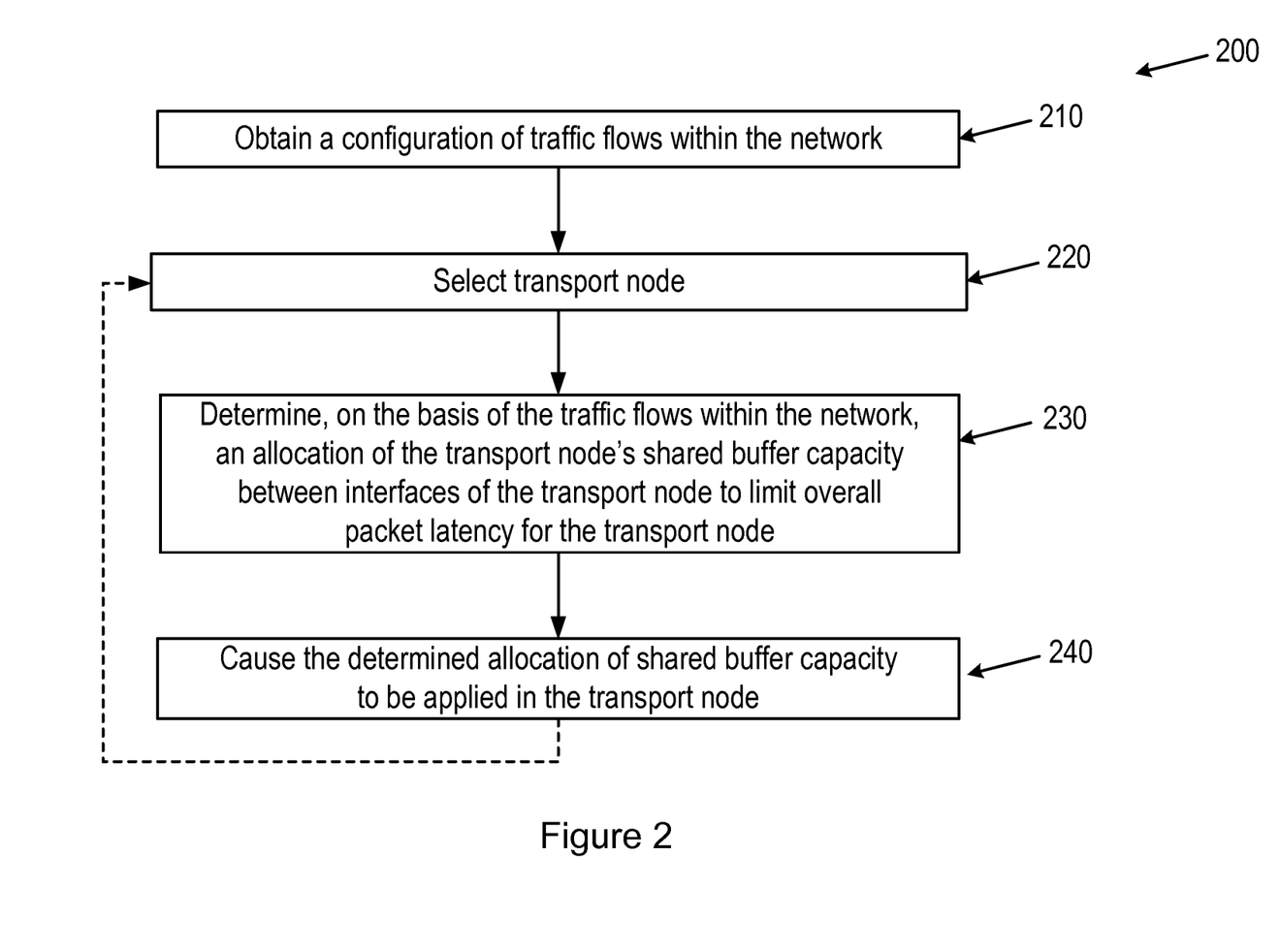
FIG. 2 is a flow chart illustrating process steps in a method for controlling shared buffer capacity in a packet switched network.

FIG. 2 is a flow chart illustrating process steps in a method 200 for controlling shared buffer capacity in a packet switched network. The method may for example be carried out in a Centralised Buffer Management (CBM) element, which may be a physical or virtual functional unit incorporated within, or in communication with, an SDN controller. The CBM may in some examples be an application running on top of a Transport SDN controller. Referring to FIG. 2, in a first step 210, the method 200 comprises obtaining a configuration of traffic flows within the network. The method then comprises selecting a transport node in step 220, and, in step 230, determining, on the basis of the traffic flows within the network, an allocation of the transport node's shared buffer capacity between interfaces of the transport node to limit overall packet latency for the transport node. The transport node may for example be a router. In step 240, the method comprises causing the determined allocation of shared buffer capacity to be applied in the transport node, for example by sending an appropriate message to the transport node, as discussed in further detail below. The method may then in some examples return to step 220 to select another transport node, so determining buffer allocation for a plurality of transport nodes within the network.

Figure 3:
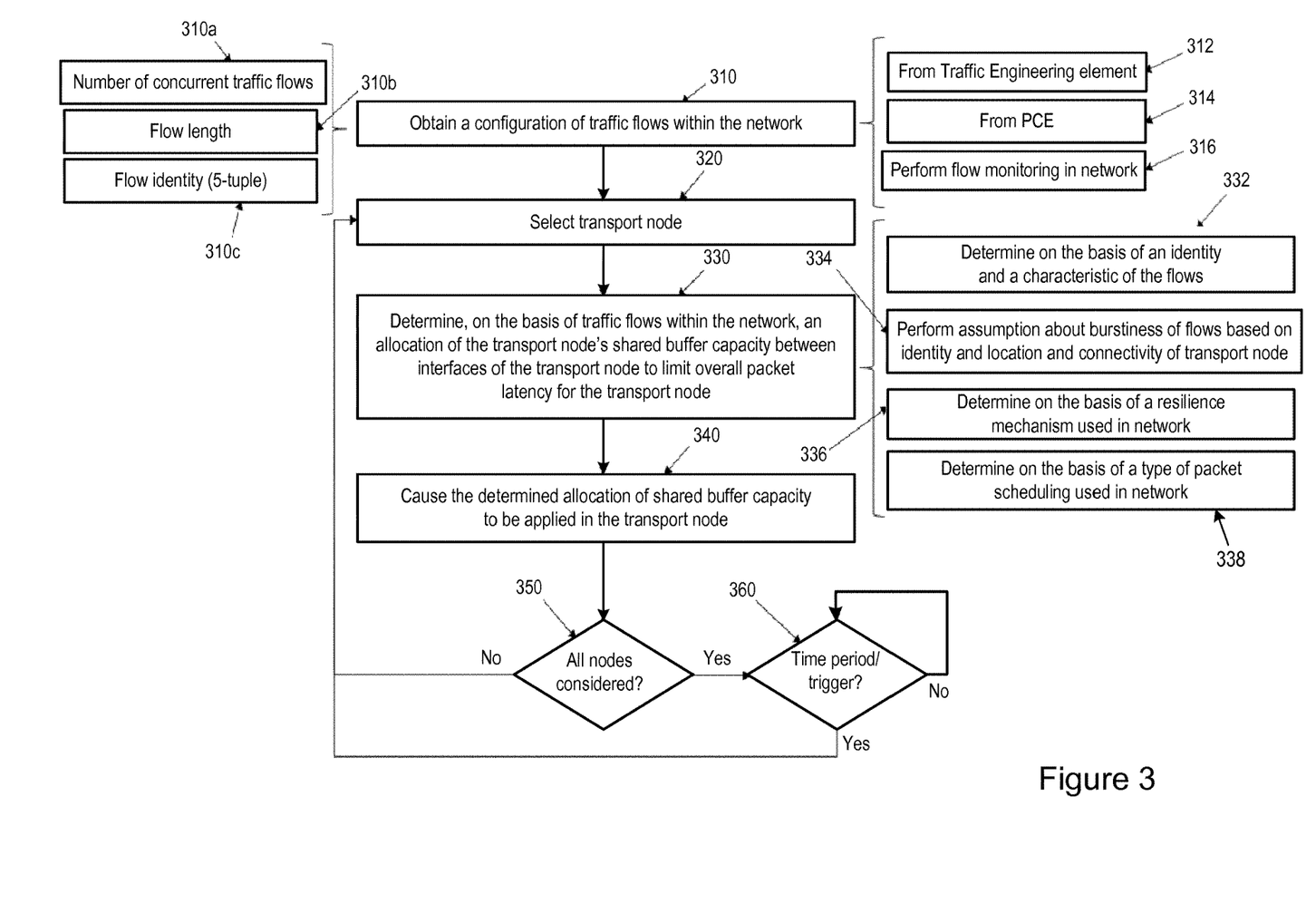
FIG. 3 is a flow chart illustrating process steps in another example of a method for controlling shared buffer capacity in a packet switched network.

FIG. 3 is flow chart illustrating process steps in another method for controlling shared buffer capacity in a packet switched network. The method 300 of FIG. 3 illustrates one way in which the steps of the method 200 of FIG. 2 may be implemented and/or augmented to achieve the above discussed functionality. The example method 300 of FIG. 3 is conducted in a CBM as discussed above with respect to FIG. 2. Referring to FIG. 3, in a first step 310, the CBM obtains a configuration of traffic flows within the network. The configuration may be obtained for example from a network element having responsibility for flow configuration in the network. Such an element may be a Traffic Engineering element, such as a PCE in a Software Defined Network, as illustrated in steps 312 and 314 of FIG. 3. In further examples, the CBM may be hosted within a management entity which has direct access to the flow configuration, and so obtaining the flow configuration may comprise obtaining the appropriate information from memory. In further examples, obtaining the configuration of traffic flows may comprise performing flow monitoring in different parts of the network, as illustrated in step 316 of FIG. 3.

The flow configuration information obtained in step 310 may comprise a number of concurrent traffic flows in at least a portion of the network 310a, and, for each of the concurrent traffic flows, a flow length 310b and a flow identity 310c. The flow identity may be the 5-tuple flow identity comprising a source IP, destination IP, source port, destination port, and protocol to identify endpoints for unidirectional flows.

The CBM then selects a transport node in step 320. The CBM may retrieve network location and interface connectivity information for the selected transport node from a memory, or may request such information from an appropriate entity, if the CBM does not have direct access to the location and connectivity information. The CBM may also retrieve or request information on the total shared buffer capacity available in the selected node. If the CBM is an application running on or in communication with an SDN controller, this information may be available from when the transport node was first registered with the SDN controller on the network.

In step 330, the CBM determines, on the basis of traffic flows within the network, an allocation of the transport node's shared buffer capacity between interfaces of the transport node to limit overall packet latency for the transport node. This determination step may additionally take into account a resilience mechanism in operation in the network, and a type of packet scheduling in use in the network, as illustrated in steps 336 and 338. The determination may be made on the basis of the identity of the traffic flows within the network and a characteristic of the traffic flows, which characteristic may be burstiness, as shown in step 332. In some examples, the CBM may make an assumption about burstiness of traffic flows within the network on the basis of the identity of the flows and a location and connectivity of the transport node, as shown in step 334. For example, the 5-tuple identity of a traffic flow, together with the network location and interface connectivity of a transport node, enables the CBM to determine which interfaces of the transport node are processing a high proportion of originating flows and which interfaces are processing a high proportion of transiting flows. Originating flows are likely to demonstrate increased burstiness compared to transiting flows, which will already have been shaped by buffering in other transport nodes through which the flows have passed. The CBM may therefore make an appropriate buffer capacity allocation to the different interfaces on the basis of the likely need for buffering indicated by the assumption about burstiness of the different flows.

Other characteristics which may be taken into account in the determination of shared buffer capacity include flow size (in bytes), or packet drops together with an associated reason for the drop; the number of packets dropped as a result of insufficient buffer capacity may for example The determination performed in step 330 may be achieved by solving the following problem for individual transport nodes. The example of transport nodes in the form of routers is used in the following discussion.

Given:

$B_i$—buffering space for each router i $a_i$—packet injection rate for each router i (or host, having a traffic origin role)

$d_i^j$—probability of a packet to be delivered from router i to router j

S—packet service time in a router without contention

R(i, j, k, h) routing function, equals 1, if route from i to j uses channel h in router k 0, otherwise Determine:

$I_{i,h}$ that is, the buffer size of each channel h at each router i that minimizes latency L. Packet service time S in the above listing may be assumed to be the same in all nodes or the actual packet service time may be used. Using actual packet service time may be beneficial as this value can in real networks vary between nodes.

The problem can be formalized as follows:

$$\min(L) \text{ such that } \forall i \sum_{h \in C_i} I_{i,h} \leq B_i \quad (1)$$

where $C_i$ is the set of channels in router i.

In one example implementation of the present disclosure, the above problem may be solved in the following manner. By using the parameters discussed above and an initial minimal allocation of $I_{i,h}$, a non-linear equation system may be set up to calculate the blocking probability $b_{r,c}$ at each channel c of each router r.

The packet arrival rate $\lambda_{r,c}$ at channel c in router r satisfies equation (2) below:

$$\lambda_{r,c} = \sum_i \sum_j a_i \times d_i^j \times R(i, j, r, c) \quad (2)$$

The service rate $\mu_{r,c}$ at channel c in router r requires a more complex formulation, including equations (3), (4) and (5) below decomposing into service rates on virtual queues.

The service rate $\mu_{r_1,c}^{-c_1}$ for the portion of traffic on channel c which is going from router $r_1$ through channel $c_1$ (to router $r_2$ through channel $c_2$) is given by equation (3), where $p_{r,c}^h$ is the probability that a packet on channel c in router r is delivered through channel h, and $b_{r,c}$ is the blocking probability of channel c on router r, that is to say the probability that the queue on that channel is full.

The above summed on all the traffic on channel c is then calculated by equation (4).

Finally, the actual service rate $\mu$ is given by equation (5), adding the arrival rate $\lambda$ and the service time without contention S.

$$\mu_{r_1,c}^{-c_1} = \frac{1}{b_{r_2,c_2}} \lambda_{r_2,c_2} + p_{r_1,c}^{c_2} \times \lambda_{r_1,c} \quad (3)$$

$$\overline{\mu}_{r,c} = \sum_{h \in C_r} p_{r,c}^h \times \overline{\mu}_{r,c}^h \quad (4)$$

$$\mu_{r,c} = \lambda_{r,c} + \frac{1}{\frac{1}{\frac{1}{S} - \lambda_{r,c}} + \frac{1}{\overline{\mu}_{r,c} - \lambda_{r,c}}} \quad (5)$$

The utilization factor $\rho$ of channel c is then:

$$\rho_{r,c} = \frac{\lambda_{r,c}}{\mu_{r,c}} \quad (6)$$

The probability b of buffer c being full is (by queue theory):

$$b_{r,c} = \frac{1 - \rho_{r,c}}{1 - \rho_{r,c}^{l_{r,c}+1}} \times \rho_{r,c}^{l_{r,c}} \quad (7)$$

Equations (2) to (7) represent a system of non-linear equations that can be solved for the b's if the given parameters of the problem and the I's are known. A solution may start by assigning the minimal allowed value to all the I's. The channel with the largest b may then be selected as the bottleneck and its I increased by 1. The process may then be repeated until the limits in (1) are reached.

The above problem definition and example solution method are adapted from J. Hu, U. Y. Ogras, R. Marculescu, "System-Level Buffer Allocation for Application-Specific Networks-on-Chip Router Design", IEEE Transactions on Computer-Aided Design of Integrated Circuits and Systems, vol. 25, no. 12, December 2006. This document discloses an algorithm for the allocation of buffer capacity that is shared for the entire Network-on-Chip. Owing to the nature of Networks-on-Chip, it will be appreciated that information regarding the entire network is readily available. According to the present disclosure, such global network information is made available through the obtaining of a configuration of traffic flows within the network, and is then used by determining, on the basis of the traffic flows within the network, an allocation of a transport node's shared buffer capacity between interfaces of the transport node to limit overall packet latency for the transport node. The algorithm conceived by the authors of the above document for a Networks-on-Chip environment, according to which buffer capacity is shared on a network level, is adapted according to the present disclosure to be applied to a geographical network, with constraints given on a per-node basis, reflecting the node level sharing of buffer capacity in a geographical network.

Having determined a shared buffer capacity allocation in step 330, the CBM then causes the shared buffer capacity allocation to be applied in the transport node in step 340. This may for example involve sending a message to the transport node including the determined shared buffer capacity allocation and an instruction to apply the determined shared buffer capacity allocation. The instruction may comprise a flag, header or other indication in the message that the buffer allocation in the message should be applied by the transport node. The CBM then checks in step 350 whether all relevant transport nodes have been considered. All relevant transport nodes may include all transport nodes in the network, or alternatively the shared buffer capacity of only some transport nodes in the network may be managed by the CBM at any one time. If some transport nodes have not yet been considered, the CBM selects a new transport node and makes a new determination on buffer allocation for that node, which is then communicated to the node.

If all relevant transport nodes have been considered, the CBM checks, in step 360, whether a time period has expired, or other trigger event has occurred, and continues to check until the time period expires or trigger event occurs. The CBM then returns to step 320 to select a transport node and repeat the determination of buffer allocation for all of the relevant transport nodes. The trigger event may be the expiration of a particular time period or may be configured by a network operator to be any event which should prompt the re-determining of shared buffer allocation. Such an event may include a particular change in network conditions or network load. The method 300 thus continues to dynamically allocate shared buffer capacity in transport nodes, adapting the allocation of shared buffer capacity in individual transport nodes to account for evolving network conditions.

In another example of the present disclosure, the steps of the methods 200 and 300 described above may be shared between a centralised management entity, such as a CBM, and individual transport nodes. The steps may be shared such that the obtaining of a configuration of traffic flows within the network is conducted by the centralised entity, and the determination of buffer allocation and causing the buffer allocation to be applied are conducted in individual transport nodes. In such examples, the methods may further comprise the step, conducted by the centralised entity, of distributing the obtained configuration of traffic flows within the network to individual transport nodes, such that each transport node may then determine, on the basis of the traffic flows within the network, an allocation of its shared buffer capacity to limit overall packet latency for the node.

Figure 4:
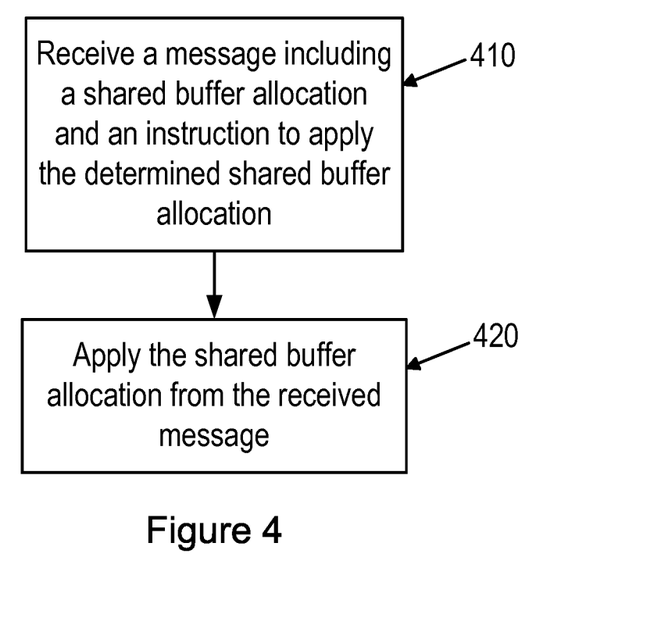
FIG. 4 is a flow chart illustrating process steps in a method in a transport node.

FIG. 4 illustrates process steps in a method 400 conducted in a transport node such as a router. The method 400 may complement the methods 200 or 300 conducted in a centralised entity. Referring to FIG. 4, in a first step 410 the transport node receives a message including a shared buffer allocation and an instruction to apply the shared buffer allocation. In step 420, the transport node then applies the share buffer capacity allocation from the received message.

Figure 5:
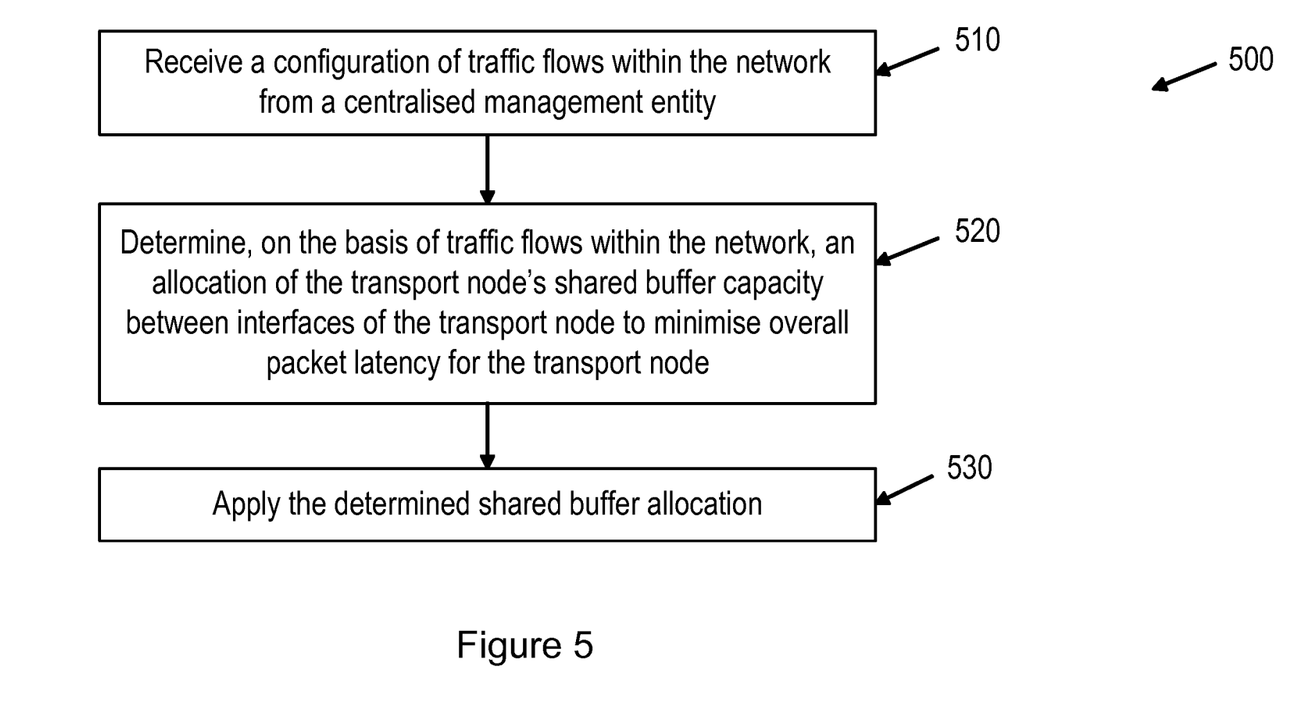
FIG. 5 is a flow chart illustrating process steps in another method in a transport node.

In accordance with the distributed determination of allocation example described above, another method 500 conducted in a transport node is illustrated in FIG. 5 and comprises receiving a configuration of traffic flows within the network from a centralised management entity in step 510. The method further comprises, in step 520, determining, on the basis of traffic flows within the network, an allocation of the transport node's shared buffer capacity between interfaces of the transport node to limit overall packet latency for the transport node, and, in step 530, applying the determined shared buffer allocation.

Figure 6:
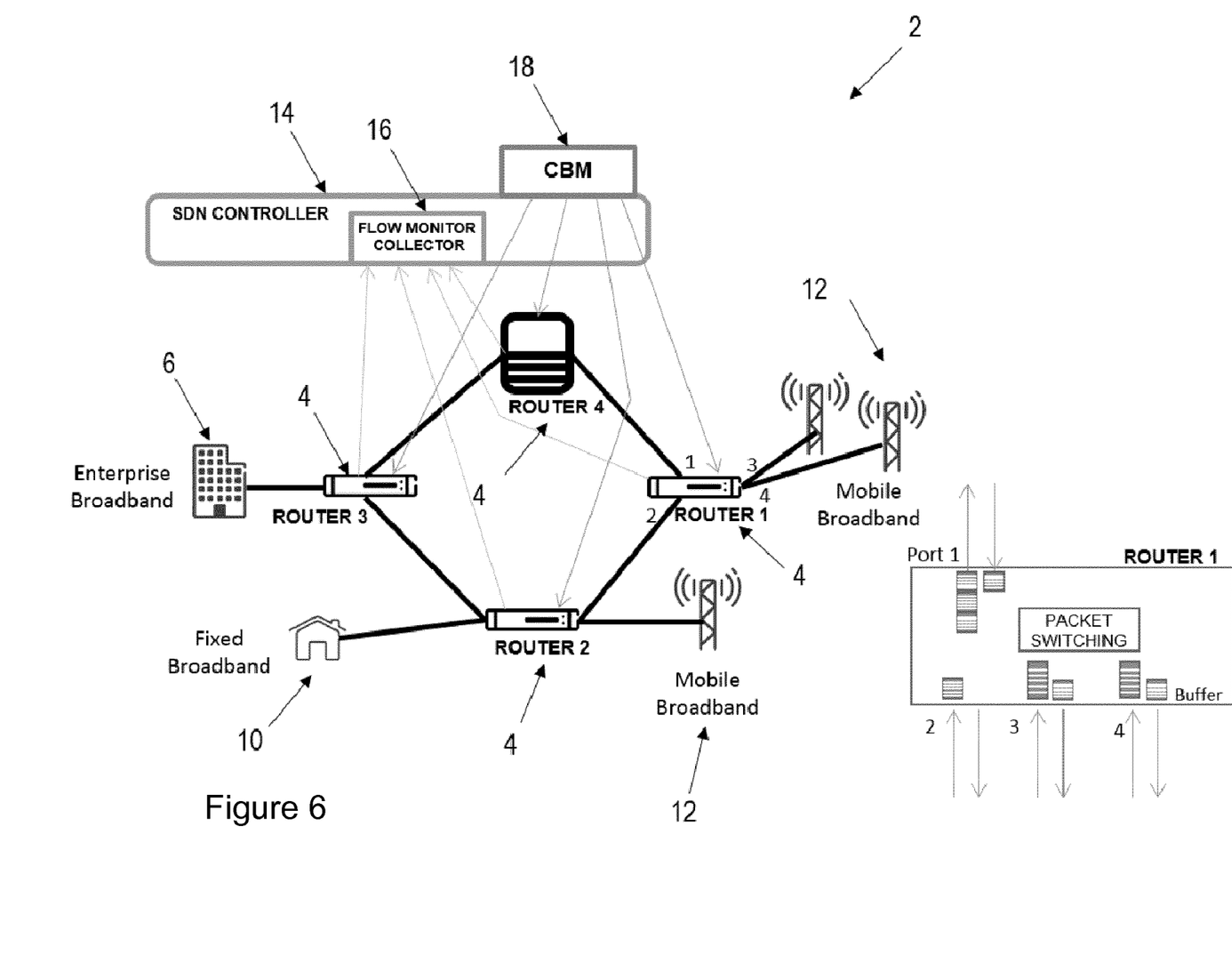
FIG. 6 is a network diagram illustrating a shared buffer allocation according to an example method in a packet switched network.

FIG. 6 illustrates an example buffer allocation which might result from operation of the above discussed methods 200, 300, 400, 500. Referring to FIG. 6, a simple example network 2 comprises four routers 4 in a ring configuration, with each router 4 in the upstream direction aggregating traffic from a downstream router with local traffic from enterprises 6 and fixed and mobile network access 10, 12. The network is managed via an SDN controller 14 which includes a Flow Monitor Collector (FMC) 16. The FMC 16 performs flow monitoring at the routers 4 of the network, ensuring that flow configuration information is available to the SDN controller 14. Running on top of the SDN controller 14 is a CBM function 18. The CBM function 18 has access to the flow configuration information held in the SDN controller 14 and manages the shared buffer capacity of the routers 4. Zooming into router 1, as shown on the right of FIG. 5, it can be seen that the CBM function 18 has determined a shared buffer capacity allocation in which limited buffer capacity is allocated to ports 1Rx, 2Tx, 2Rx, 3Tx and 4Tx. A greater buffer capacity is allocated to ports 3Rx and 4Rx, which are receiving incoming mobile broadband from Radio Base Stations. The largest buffer capacity allocation is made to the outgoing port 1Tx, where the largest amount of traffic is aggregated. This buffer allocation, based on network need as indicated by established traffic flows, differs from that which would have been established by the router on the basis of local measurements made at the individual interfaces. Such measurements reflect transient behaviours, and so can be misleading. Additionally, such local measurements reflect the state of local network resources as opposed to global network need, as indicated by the long term traffic flows.

Figure 7:
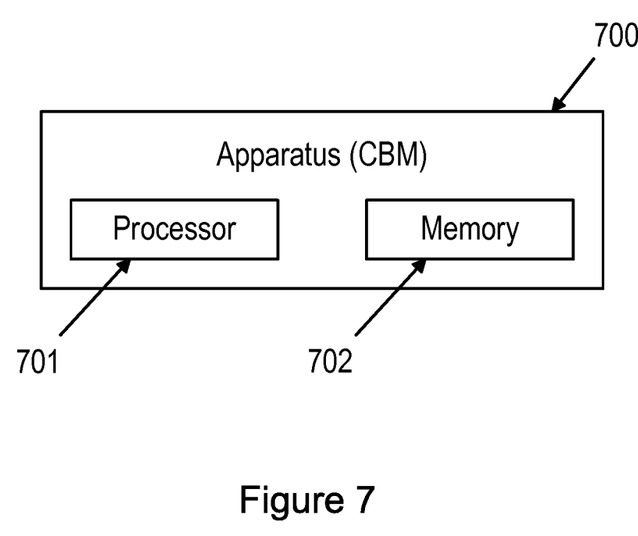
FIG. 7 is a block diagram illustrating functional units in an apparatus.
Figure 8:
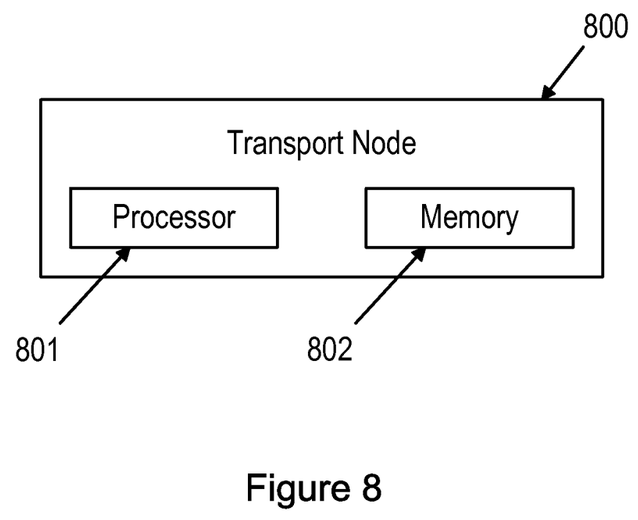
FIG. 8 is a block diagram illustrating functional units in a transport node.

As discussed above, the methods 200 and 300 may be carried out by apparatus implementing a centralised buffer management function, running on or in communication with a SDN controller in a packet switched network. The methods 400 and 500 may be carried out by a transport node, which may for example be a router. FIG. 7 illustrates an example apparatus 700 which may implement the methods 200, 300 for example on receipt of suitable instructions from a computer program. Referring to FIG. 7, the apparatus 700 comprises a processor 701 and a memory 702. The memory 702 contains instructions executable by the processor 701 such that the apparatus 700 is operative to conduct some or all of the steps of the methods 200 and/or 300. FIG. 8 illustrates an example of a transport node 800, which may implement the methods 400, 500, for example on receipt of suitable instructions from a computer program. Referring to FIG. 8, transport node 800 comprises a processor 801 and a memory 802. The memory 802 contains instructions executable by the processor 801 such that the transport node 800 is operative to conduct some or all of the steps of the methods 400 and/or 500.

Figure 9:
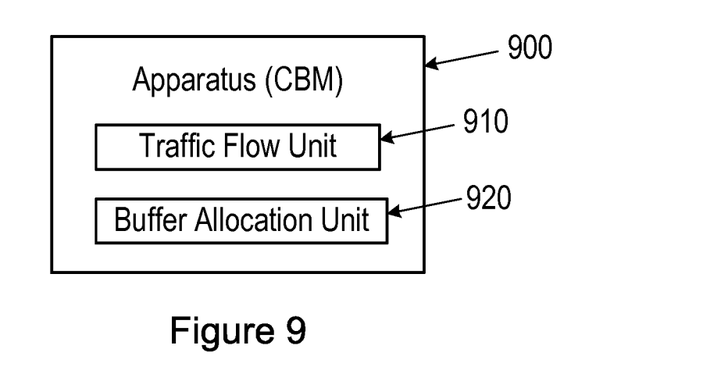
FIG. 9 is a block diagram illustrating functional units in another example of apparatus.

FIG. 9 illustrates an alternative example apparatus 900, which may implement the methods 200, 300, for example on receipt of suitable instructions from a computer program. The apparatus implements a centralised buffer management function, which may run on or be in communication with an SDN controller in a packet switched network. It will be appreciated that the units illustrated in FIG. 9 may be realised in any appropriate combination of hardware and/or software. For example, the units may comprise one or more processors and one or more memories containing instructions executable by the one or more processors. The units may be integrated to any degree.

Referring to FIG. 9, the apparatus comprises a traffic flow unit 910 adapted to obtain a configuration of traffic flows within the network, and a buffer allocation unit 920. The buffer allocation unit 920 is adapted to, for a transport node, determine, on the basis of traffic flows within the network, an allocation of the transport node's shared buffer capacity between interfaces of the transport node to limit overall packet latency for the transport node, and cause the determined allocation of shared buffer capacity to be applied in the transport node.

The traffic flow unit 910 may be adapted to obtain the configuration of traffic flows from a network element having a Traffic Engineering function in the network, such as a PCE. Alternatively, or in addition, the traffic flow unit 910 may be adapted to obtain the configuration of traffic flows by performing flow monitoring within the network.

The traffic flow unit 910 may be adapted to obtain, for at least a part of the network: the number of concurrent traffic flows, and for each concurrent traffic flow: the length of the flow and a flow identity.

The buffer allocation unit 920 may be adapted to determine the allocation of shared buffer capacity on the basis of an identity and a characteristic of the flows within the network.

The buffer allocation unit 920 may be adapted to perform an assumption about the brustiness of traffic flows within the network based on the identity of the traffic flows and a location and interface connectivity of the transport node in the network topology.

The buffer allocation unit 920 may be adapted to determine the allocation of shared buffer capacity on the basis of a resilience mechanism used in the network and/or a type of packet scheduling used in the network.

The buffer allocation unit 920 may be adapted to cause a message to be transmitted to the transport node, the message including the determined shared buffer allocation and an instruction to apply the determined shared buffer allocation.

In further examples of the apparatus 900, the traffic flow unit 910 may be adapted to distribute the obtained configuration of traffic flows to the transport node.

Figure 10:
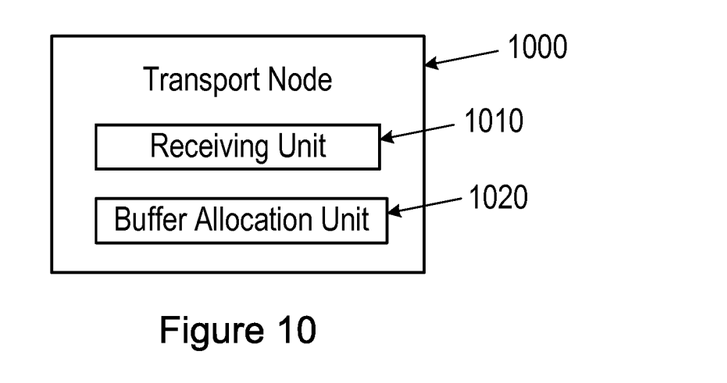
FIG. 10 is a block diagram illustrating functional units in another example of transport node.

FIG. 10 illustrates an alternative example of a transport node 1000 of a packet switched network. The transport node may for example be a router and may implement the method 400 or 500, for example on receipt of suitable instructions from a computer program. It will be appreciated that the units illustrated in FIG. 10 may be realised in any appropriate combination of hardware and/or software. For example, the units may comprise one or more processors and one or more memories containing instructions executable by the one or more processors. The units may be integrated to any degree.

Referring to FIG. 10, the transport node comprises a receiving unit 1010, adapted to receive a message including a shared buffer allocation and an instruction to apply the determined shared buffer allocation, and a buffer allocation unit 1020, adapted to apply the shared buffer allocation from the received message. In further examples of the transport node 1000, the receiving unit 1010 may be adapted to receive a configuration of traffic flows within the network from a centralised management entity. The buffer allocation unit 1020 may be adapted to determine, on the basis of traffic flows within the network, an allocation of the transport node's shared buffer capacity between interfaces of the transport node to limit overall packet latency for the transport node, and to apply the shared buffer allocation from the received message.

Aspects of the present disclosure thus provide a method according to which shared buffer allocation for individual transport nodes is centrally controlled by an entity that may have full knowledge about network conditions and characteristics, thus ensuring an optimal allocation of the shared buffer resource for the different Receive and Transmit ports of the transport node. With a global view of network conditions, the centralised management entity may, for example, allocate more of a shared memory resource to particular ports on a transport node which are experiencing very bursty traffic, for example from radio base stations, and less to other ports which are receiving traffic from other routers, where packet aggregation has reduced burstiness. In other examples, the centralised management entity may allocate more shared buffer resource to ports which would be heavily impacted by fibre and node breaks, while still aiming to recover most of the traffic.

Particular advantages in network performance may be gained by optimising shared buffer allocation in peripheral routers, which experience the most bursty traffic. Optimal allocation of shared buffer for transport nodes processing originating flows ensures optimal flow shaping of this traffic, meaning little or no further buffering is required downstream on the same traffic flows.

By ensuring a more efficient use of shared buffer resource in transport nodes, aspects of the present disclosure enable superior network performance without increasing the total amount of buffer available in individual transport nodes, or may enable a reduction of total buffer capacity, and associated cost savings, without compromising network performance.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for controlling shared buffer capacity in a packet switched network comprising a plurality of transport nodes, each transport node comprising a shared buffer capacity which may be allocated to interfaces of the transport node, the method comprising:
obtaining a configuration of traffic flows within the network;
for each transport node within the network,
determining, on the basis of traffic flows within the network, an allocation of the transport node's shared buffer capacity between interfaces of the transport node to limit overall packet latency for the transport node, wherein the determining of the allocation of the transport node's shared buffer capacity is further based on information related to at least another transport node within the network, an identity, and a characteristic of the traffic flows within the network, wherein the characteristic of the traffic flows comprises a number of bursts of traffic in the traffic flows, wherein determining the shared buffer capacity between the interfaces of the transport node comprises:
determining which interfaces of the transport node are experiencing a larger number of incoming bursts of traffic compared to other interfaces;

allocating more portions from the shared buffer capacity to interfaces which are experiencing the larger number of incoming bursts of traffic;
determining which interfaces of the transport node are experiencing a larger number of outgoing bursts of traffic compared to other interfaces; and
allocating more portions from the shared buffer capacity to interfaces which are experiencing the larger number of outgoing bursts of traffic; and
causing the determined allocation of shared buffer capacity to be applied in the transport node.

2. A method as claimed in claim 1, wherein obtaining a configuration of traffic flows within the network comprises obtaining the configuration from a network element having a Traffic Engineering function in the network.

3. A method as claimed in claim 1, wherein obtaining a configuration of traffic flows within the network comprises performing flow monitoring within the network.

4. A method as claimed in claim 1, wherein obtaining a configuration of traffic flows within the network comprises obtaining:
for at least a part of the network: the number of concurrent traffic flows, and
for each concurrent traffic flow: the length of the flow and a flow identity.

5. A method as claimed in claim 1, wherein determining the characteristic of the traffic flows within the network comprises determining a number of packets dropped as a result of insufficient buffer capacity in a transport node.

6. A method as claimed in claim 1, wherein determining, on the basis of traffic flows within the network, an allocation of the transport node's shared buffer capacity between interfaces of the transport node to limit overall packet latency for the transport node further comprises:
allocating more shared buffer resources to ports which would transmit a large number of bursts of traffic; and
allocating more shared buffer resources to ports which would receive a large number of bursts of traffic.

7. A method as claimed in claim 1, wherein determining, on the basis of traffic flows within the network, an allocation of the transport node's shared buffer capacity between interfaces of the transport node to limit overall packet latency for the transport node further comprises:
determining the allocation of shared buffer capacity on the basis of a type of packet scheduling used in the network.

8. A method as claimed in claim 1, wherein causing the determined allocation of shared buffer capacity to be applied in the transport node comprises:
causing a message to be transmitted to the transport node, the message including the determined shared buffer allocation and an instruction to apply the determined shared buffer allocation.

9. A method as claimed in claim 1, wherein the method is conducted in a centralised management entity.

10. A method as claimed in claim 9, wherein the network comprises a Software Defined Network, SDN, and wherein the centralised management entity is incorporated within or in communication with an SDN controller of the network.

11. A method as claimed in claim 1 further comprising:
distributing the obtained configuration of traffic flows to the transport node;
and wherein causing the determined allocation of shared buffer capacity to be applied in the transport node comprises applying the determined allocation of shared buffer capacity in the transport node.

12. A method as claimed in claim 1, wherein:
obtaining a configuration of traffic flows within the network is conducted in a centralised management entity; and wherein
determining, on the basis of traffic flows within the network, an allocation of the transport node's shared buffer capacity between interfaces of the transport node to limit overall packet latency for the transport node and causing the determined allocation of shared buffer capacity to be applied in the transport node, are conducted within the transport node.

13. A method in a transport node of a packet switched network, the transport node comprising a shared buffer capacity which may be allocated to interfaces of the transport node, the method comprising:
receiving a message including a determined shared buffer allocation, information related to at least another transport node within the packet switched network, an identity, and a characteristic of traffic flows within the network, wherein the characteristic of the traffic flows comprises a number of bursts of traffic in the traffic flows, and instructions to apply the determined shared buffer allocation, wherein the instructions to apply the determined shared buffer allocation comprises:
first instructions for determining which interfaces of the transport node are experiencing a larger number of incoming bursts of traffic compared to other interfaces;
second instructions for allocating more portions from the shared buffer capacity to interfaces which are experiencing the larger number of incoming bursts of traffic;
third instructions for determining which interfaces of the transport node are experiencing a larger number of outgoing bursts of traffic compared to other interfaces; and
fourth instructions for allocating more portions from the shared buffer capacity to interfaces which are experiencing the larger number of outgoing bursts of traffic; and
applying the determined shared buffer allocation from the received message.

14. A method in a transport node of a packet switched network, the transport node comprising a shared buffer capacity which may be allocated to interfaces of the transport node, the method comprising:
receiving a configuration of traffic flows within the network from a centralised management entity;
determining, on the basis of traffic flows within the network, an allocation of the transport node's shared buffer capacity between interfaces of the transport node to limit overall packet latency for the transport node, wherein the determining of the allocation of the transport node's shared buffer capacity is based on information related to at least another transport node within the network, an identity, and a characteristic of the traffic flows within the network, wherein the characteristic of the traffic flows comprises a number of bursts of traffic in the traffic flows, wherein determining the shared buffer capacity between the interfaces of the transport node comprises:
determining which interfaces of the transport node are experiencing a larger number of incoming bursts of traffic compared to other interfaces;
allocating more portions from the shared buffer capacity to interfaces which are experiencing the larger number of incoming bursts of traffic;

determining which interfaces of the transport node are experiencing a larger number of outgoing bursts of traffic compared to other interfaces; and allocating more portions from the shared buffer capacity to interfaces which are experiencing the larger number of outgoing bursts of traffic; and applying the determined shared buffer allocation.

15. A computer readable non-transitory storage medium storing a computer program which, when executed on at least one processor, causes the at least one processor to carry out a method according to claim 13.

16. A computer program product comprising a computer readable non-transitory storage medium having stored thereon a computer program as claimed in claim 15.

17. Apparatus for controlling shared buffer capacity in a packet switched network comprising a plurality of transport nodes, each transport node comprising a shared buffer capacity which may be allocated to interfaces of the transport node, the apparatus comprising a processor and a memory, the memory containing instructions executable by the processor such that the apparatus is operative to:

obtain a configuration of traffic flows within the network;

for each transport node within the network, determine, on the basis of traffic flows within the network, an allocation of the transport node's shared buffer capacity between interfaces of the transport node to limit overall packet latency for the transport node, wherein the allocation of the transport node's shared buffer capacity is determined further based on information related to at least another transport node within the network, an identity, and a characteristic of the traffic flows within the network, wherein the characteristic of the traffic flows comprises a number of bursts of traffic in the traffic flows, wherein the apparatus operative to determine the shared buffer capacity between the interfaces of the transport node comprises the apparatus operative to:

determine which interfaces of the transport node are experiencing a larger number of incoming bursts of traffic compared to other interfaces;

allocate more portions from the shared buffer capacity to interfaces which are experiencing the larger number of incoming bursts of traffic;

determine which interfaces of the transport node are experiencing a larger number of outgoing bursts of traffic compared to other interfaces; and allocate more portions from the shared buffer capacity to interfaces which are experiencing the larger number of outgoing bursts of traffic; and cause the determined allocation of shared buffer capacity to be applied in the transport node.

18. A transport node of a packet switched network, the transport node comprising a shared buffer capacity which may be allocated to interfaces of the transport node, the transport node further comprising a processor and a memory, the memory containing instructions executable by the processor such that the transport node is operative to:

receive a message including a shared buffer allocation, information related to at least another transport node within the packet switched network, an identity, and a characteristic of traffic flows within the network, wherein the characteristic of the traffic flows comprises a number of bursts of traffic in the traffic flows, and instructions to apply the determined shared buffer allocation, wherein the instructions to apply the determined shared buffer allocation comprises:

first instructions for determining which interfaces of the transport node are experiencing a larger number of incoming bursts of traffic compared to other interfaces;

second instructions for allocating more portions from the shared buffer capacity to interfaces which are experiencing the larger number of incoming bursts of traffic;

third instructions for determining which interfaces of the transport node are experiencing a larger number of outgoing bursts of traffic compared to other interfaces; and fourth instructions for allocating more portions from the shared buffer capacity to interfaces which are experiencing the larger number of outgoing bursts of traffic; and apply the shared buffer allocation from the received message.

19. A transport node of a packet switched network, the transport node comprising a shared buffer capacity which may be allocated to interfaces of the transport node, the transport node further comprising a processor and a memory, the memory containing instructions executable by the processor such that the transport node is operative to:

receive a configuration of traffic flows within the network from a centralised management entity;

determine, on the basis of traffic flows within the network, an allocation of the transport node's shared buffer capacity between interfaces of the transport node to limit overall packet latency for the transport node, wherein the allocation of the transport node's shared buffer capacity is determined further based on information related to at least another transport node within the network, an identity, and a characteristic of the traffic flows within the network, wherein the characteristic of the traffic flows comprises a number of bursts of traffic in the traffic flows, wherein the transport node operative to determine the shared buffer capacity between the interfaces of the transport node comprises the transport node operative to:

determine which interfaces of the transport node are experiencing a larger number of incoming bursts of traffic compared to other interfaces;

allocate more portions from the shared buffer capacity to interfaces which are experiencing the larger number of incoming bursts of traffic;

determine which interfaces of the transport node are experiencing a larger number of outgoing bursts of traffic compared to other interfaces; and allocate more portions from the shared buffer capacity to interfaces which are experiencing the larger number of outgoing bursts of traffic; and apply the determined shared buffer allocation.

\* \* \* \* \*